United States Patent [19]

Diong et al.

[11] Patent Number: 5,489,891
[45] Date of Patent: *Feb. 6, 1996

[54] CONTROL MEANS FOR LIGHTING DEVICES

[75] Inventors: Chong Khai Diong, Kuala Lumpur; Kian Thaw Choong, Pulau Pinang, both of Malaysia

[73] Assignee: Noval Controls SDN BHD, Selangor, Malaysia

[*] Notice: The term of this patent shall not extend beyond the expiratin date of Pat. No. 5,349,330.

[21] Appl. No.: 166,626

[22] Filed: Dec. 15, 1993

Related U.S. Application Data

[63] Continuation-in-part of Ser. No. 40,271, Mar. 30, 1993, Pat. No. 5,349,330.

[30] Foreign Application Priority Data

Jan. 29, 1993 [MY] Malaysia .................. 9300148

[51] Int. Cl.⁶ ............................... G08B 13/19
[52] U.S. Cl. .................. 340/567; 315/133; 315/155; 315/159; 340/691; 340/693; 362/20; 362/802
[58] Field of Search .................... 340/567, 691, 340/693; 315/133, 155, 159; 362/802, 20

[56] References Cited

U.S. PATENT DOCUMENTS

| | | | |
|---|---|---|---|
| 4,647,788 | 3/1987 | Maile et al. | 307/117 |
| 4,650,986 | 3/1987 | Maile | 250/221 |
| 4,663,521 | 5/1987 | Maile | 250/221 |
| 4,694,281 | 9/1987 | McDermott et al. | 340/693 |
| 4,843,283 | 6/1989 | Chen | 307/117 |
| 4,943,712 | 7/1990 | Wilder | 250/221 |
| 4,970,494 | 11/1990 | Keely et al. | 340/539 |
| 5,015,994 | 5/1991 | Hoberman et al. | 340/567 |
| 5,128,654 | 7/1992 | Griffin et al. | 340/600 |
| 5,146,209 | 9/1992 | Beghelli | 340/691 |
| 5,293,097 | 3/1994 | Elwell | 307/116 |
| 5,336,977 | 8/1994 | Li | 307/66 |
| 5,349,330 | 9/1994 | Diong et al. | 340/691 |

FOREIGN PATENT DOCUMENTS

| | | |
|---|---|---|
| 2488429 | 2/1982 | France . |
| 2239742 | 7/1991 | United Kingdom . |

*Primary Examiner*—Glen Swann
*Attorney, Agent, or Firm*—Jacobson, Price, Holman & Stern

[57] ABSTRACT

Disclosed is a touch-programmable lighting and security device in the form of a stand lamp which can be programmed to provide illumination by means of an AC bulb or DC bulb in conjunction with parameters including the ambient light level, presence of people, and AC mains power failure. In one embodiment, this novel lighting and security device includes a transmitter which transmits an Alarm signal to a remote receiver upon detection of an intruder. This user friendly device conveniently plugs into any wall power outlet by means of a suitable length of cable and it can be easily programmed by touching different nonmetallic areas of the device. In one embodiment, four indicator lights in the form of LEDs are provided to identify its prevailing mode.

13 Claims, 3 Drawing Sheets

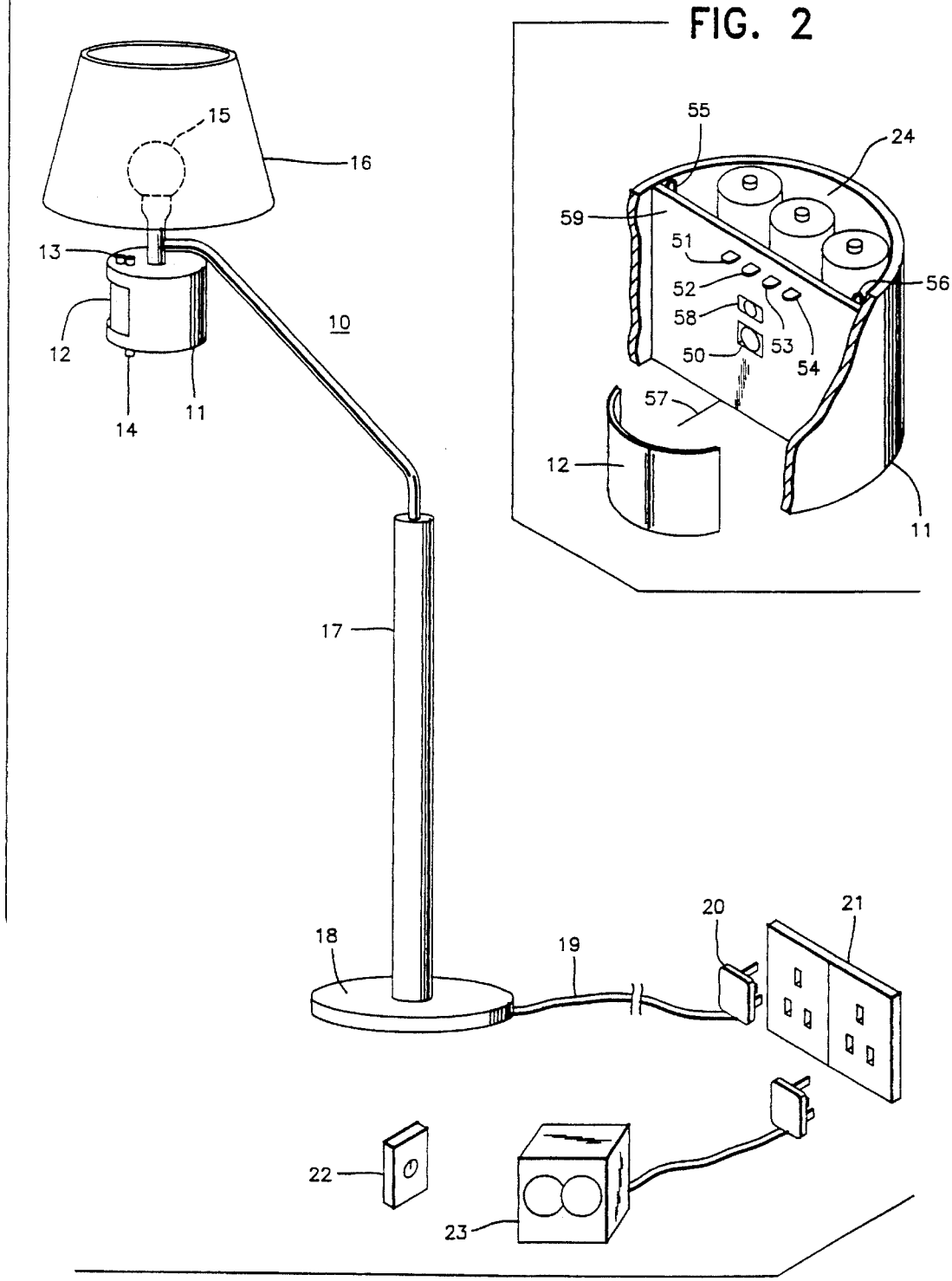

CONTROL MEANS FOR LIGHTING DEVICES

CROSS-REFERENCE TO A RELATED APPLICATION

This application is a continuation-in-part of U.S. patent appln. Ser. No. 08/040,271, filed Mar. 30, 1993, now U.S. Pat. No. 5,349,330 which issued Sep. 20, 1994.

TECHNICAL FIELD

The present invention relates generally to a control means for lifting deuces and more particularly to a control means for automatic lighting devices that provide illumination under user specified conditions.

BACKGROUND OF THE INVENTION

Basic automatic and security lighting systems are well known in prior art. Generally, these devices turn on a light source automatically when the presence of one or more persons is detected within its range. The light source continues to illuminate for a predetermined period of time after the detection ceases. A light sensitive component is usually incorporated to inhibit the activation of the light source when the ambient light level is high. There are two broad categories, namely indoor and outdoor automatic lights. The latter have two inherent limitations. Firstly, they require installation. They have to be installed at a considerable height and wired permanently to the building's electrical system, usually by technical personnel. Secondly, they cannot be designed with many user programmable functions (modes) as it would be inconvenient to control them because of the height. For example, an outdoor motion detector as disclosed in U.S. Pat. No. 4,943,712 by Richard L. Wilder, has an override mode which could be activated by disrupting the power switch in a predetermined sequence within a short period of time. This can be confusing to non-technical users and impractical when there are more than two modes to control. Indoor automatic and security lights such as disclosed in U.S. Pat. No. 5,015,994 by Kenneth Hoberman and Kim Kirwan solve the installation problem as they can be plugged into a standard wall power outlet by a prolonged plug built into the self-contained lighting devices. However, their application is limited because existing wall outlets may not be situated in a favourable location for detection, illumination and/or ambient light sensing. This constraint may render it impossible to use such devices under certain circumstances. In addition, the self-contained construction of such indoor devices limits the type, size and wattage of the bulbs used.

While all preceding systems of the art have brought about a certain degree of convenience and protection providing automatic lighting and security, there remains the need for a versatile, easily installed, user friendly and full feature device to provide programmable illumination and security at the same time.

OBJECTS OF THE INVENTION

It is therefore an object of the present invention is to provide a control for illumination means that requires minimum installation, is portable, and is not constrained to be located at existing wall power outlets.

A further object of the present invention is to provide an intelligent control for illumination means that can provide illumination by way of AC power and DC power in conjunction with user definable parameters.

The present invention overcomes the shortcomings of the prior art by providing a control means for providing electrical power to a illumination means. The control means has at least three conditions of operation, these being respectively:

Passive infrared (PIR) Mode. The bulb will be illuminated when the level of ambient light falls below a predetermined level and when people are present. To provide this function, the control means includes means for receiving an input by detecting the presence of moving infrared radiation sources and has means to compare the ambient light level with a pre-set threshold.

Sensor Light Mode. The bulb will be illuminated when the level of ambient light falls below a predetermined level. To provide this function, the control means includes means to compare the ambient light level with a pre-set threshold and also has means to sample the ambient light level at predetermined intervals.

Manual Override Mode. No condition. The control means includes means to electronically override the first and second modes to allow electrical power to flow to the illumination means.

The control means can be physically a part of a lamp such as a courtesy lamp, a standard lamp or the like, or it can be formed as a separate unit designed to be electrically connected between a source of electrical power and a lamp which may be an fluorescent or incandescent bulb.

SUMMARY OF THE INVENTION

Accordingly one form of the invention comprises a control for .electrically energizing an illumination means, said control having:

input means for connection to a source of electrical energy, output means for connection of electrical energy from the control to said illumination means, first means to detect the presence of moving infrared radiation sources;

second means to compare the level of ambient light with a preset threshold; and third means to electronically override the said first means and said second means, said control having modes of operation which comprise:

a first operation mode wherein said output means is energized upon the detection of a moving infrared radiation source and remains energized for a predetermined period of time after cessation of said detection, provided the ambient light intensity is below a predetermined level, a second operation mode wherein said output means is energized when the ambient light intensity is below a predetermined level regardless of detection of a moving infrared radiation source, and a third operation mode wherein said output means is energized regardless of detection of a moving infrared radiation source or ambient light level, wherein each of said operation modes is controlled by a signal generated by a proximity sensor In another form the invention comprises;

(a) means for receiving manual inputs by way of touch;

(b) means for receiving automatic inputs by detecting the presence of moving infrared radiation sources and ambient light level;

(c) output means including a light source which can provide illumination when supplied with a source of alternating current electrical power;

(d) means for conditioning said output means in response to signals received from said manual input means and said automatic input means; and (e) means to provide an electrical connection to a source of alternating current electrical power.

Preferably the various modes of operation can be obtained by proximity sensors.

Preferably the control means includes a visual indication of the current mode of operation.

Preferably the indication of the current mode of operation is provided by light emitting diodes.

Preferably the control means includes means to interrupt the passage of electrical power to the illumination means for a predetermined interval, and means to maintain the passage of electrical power for a predetermined interval.

Preferably the control means includes a passive infrared (PIR) motion detector, a photocell, proximity sensors, status indicators, and associated electronic circuits all of which are housed within a container which has electrical and mechanical connecting means.

Preferably the control means includes a battery back up power source capable of operating a second light in the absence of alternating current power.

Preferably the control means includes an alarm mode by which it will send a signal to a remote alarm sounder upon detection of the presence of an intruder.

BRIEF DESCRIPTION OF THE DRAWINGS

FIG. 1 is an external view of one embodiment of the control means constructed in accordance with the teachings of this invention in conjunction with an illumination means;

FIG. 2 is a partially cut-out perspective view of an attachment which houses the control means;

DETAILED DESCRIPTION OF THE PREFERRED EMBODIMENT

Figure 3:
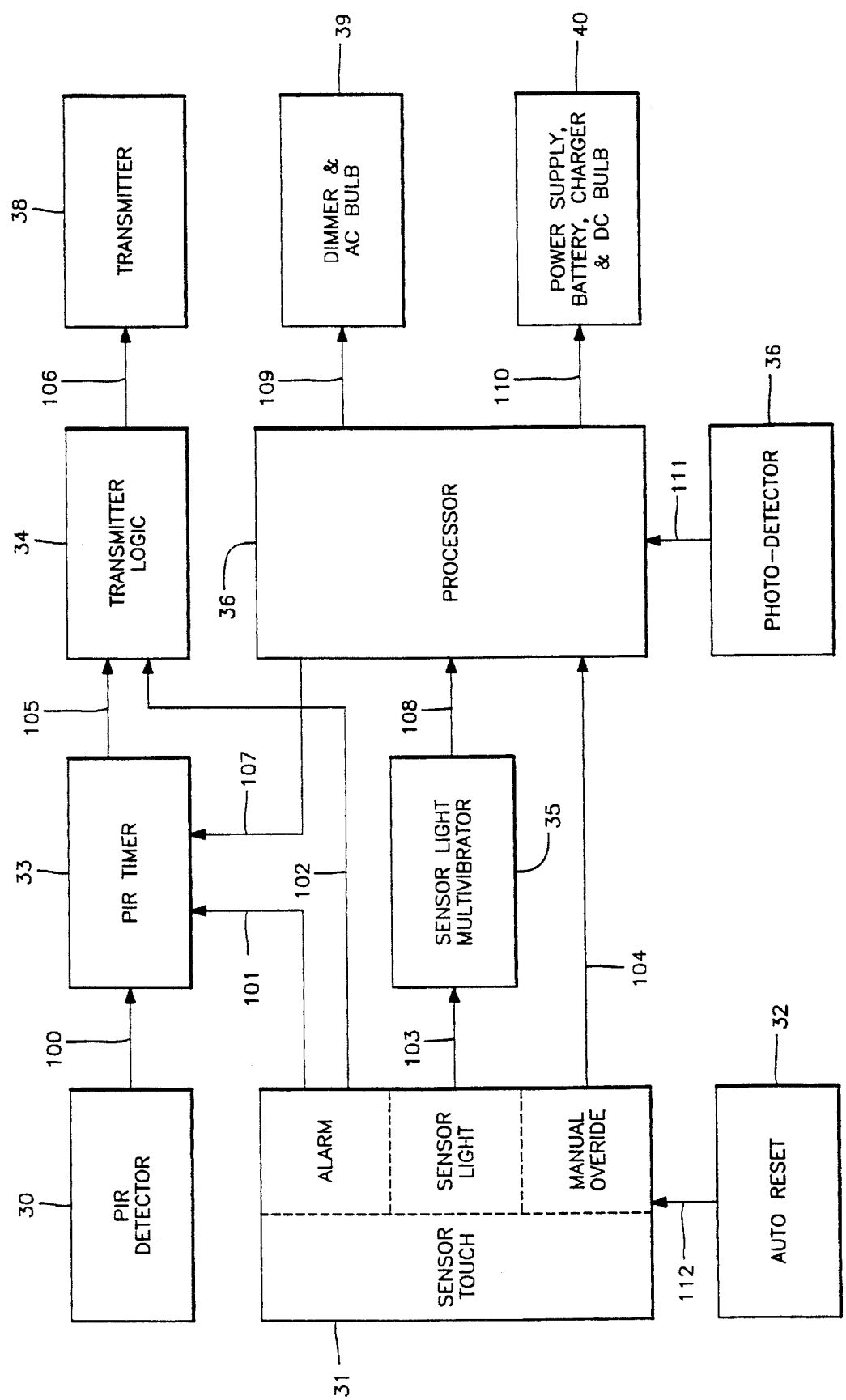
FIG. 3 is a block diagram of the control means.

In the drawings, FIG. 1 illustrates a form of the invention wherein the control means is housed in an attachment to a lamp. In this form, the attachment (11), equipped with a fresnel lens (12) and constructed from a non-conductive material which houses all the electronics, is affixed to the high end of the lamp (10) next to an AC bulb (15) and a lamp shade (16). A stand (17), a base (18), an electric cord (19) and an electrical plug (20) make up the rest of the lamp. The entire lamp is made operational by merely plugging it into a standard electrical wall outlet (21).

The arrangement may also include a remote alarm receiver and sounder unit complete with rechargeable batteries and auto-dialer (23) which is also fully operational when plugged into any electrical wall power outlet for receiving a wireless alarm signal transmitted from the control means when it is in Alarm mode. The said signal will activate the alarm sounder and auto-dialer contained in the said remote receiver unit (23), which may be armed and disarmed by a hand-held wireless remote controller (22).

FIG. 2 shows the detailed construction of key components housed in attachment (11). Status indicators for the Alarm mode (51), Sensor Light mode (52), PIR mode (53), and Manual Override mode (54) are mounted on the front side of the printed circuit board (PCB) (59).

The attachment may include a DC halogen bulb (58) and pyroelectric sensor (50) mounted below the LEDs and in the centre of curvature of fresnel lens (12), through which the said LEDs and said bulb is focused and made visible when illuminated.

Proximity sensor antennae for Sensor light/PIR mode (55), Manual Override mode (56), and Alarm mode (57) extend from the sides of PCB (59) and rest along the three sides of the housing of attachment (11), namely the left, right and bottom respectively. A set of backup batteries (24) may be provided at the back of PCB (59).

When the attachment is first powered up, an internal auto-reset circuit sets it to its default Sensor Light and Alarm mode. The Sensor Light LED (52) lights up, and the AC bulb will illuminate whenever the ambient light intensity drops below a predetermined level irrespective of the presence or absence of people.

If the attachment (11) includes an alarm mode, when the attachment is first powered up, the alarm LED (51) lights up and a wireless alarm signal is sent to the remote receiver (23) to sound an alarm whenever the presence of an intruder is detected. This mode is ideal when one goes on holiday as the lamp comes on automatically at night, switching off again as day breaks and the alarm is triggered whenever an intruder enters the area of surveillance during day or night, even after a total power loss.

The default mode can be changed and all other possible mode combinations of the lamp (10) can be invoked by merely touching the respective sides of the attachment (11) housing. All modes toggle on and off every time their respective sides are touched. For example, touching the left side once changes the mode from Sensor Light mode to PIR mode. Touching it again changes it back to Sensor Light mode. Touching the fight side once enables the manual override mode, and touching it again causes the lamp to revert to automatic mode (depending on the PIR or Sensor Light mode setting).

If the attachment includes the alarm mode, touching the bottom of the attachment enables the Alarm mode, and touching it again disables it.

The four status LEDs (51,52,53,64) respond accordingly every time the mode is changed.

When set to PIR mode, the PIR LED (53) flashes momentarily whenever motion is detected. The AC bulb (15) now illuminates for a predetermined period of time which is user adjustable by means of timer knob (14) only when it is dark and during continued detection of the presence of people. When set to the Manual Override mode, the Manual Override LED (54) lights up and AC bulb (15) is illuminated permanently. The Manual Override can be activated in either the Sensor Light or PIR mode with the same effect. The AC bulb may be provided with a dimmer which can be adjusted by means of a dimmer knob (13) to vary its brightness.

The attachment may also include a back-up facility whereby when there is a disruption of power in the AC mains, a set of rechargeable batteries is provided as backup power to all logic circuits and to provide emergency lighting by way of a DC bulb (58) located at the focal point of the fresnel lens. In the manual override mode, the emergency light is activated whenever there is an AC mains power failure. In the Sensor Light mode, the DC bulb (61) is activated when there is a power failure AND when it is dark. In the PIR mode, the emergency light is activated in the event of a power failure only when it is dark AND when the presence of people is detected. These features make the lamp (10) a very flexible and intelligent lighting device as there is no unnecessary wastage of backup power, thereby requiting only a low ampere-hour rating battery and enabling the entire attachment unit to be made small and light.

Table 1 below summarises all possible combination of modes and output functions.

TABLE 1

| S/L | PIR | MAN | ALM | AC Mains ON | AC Mains Fall |
|-----|-----|-----|-----|-------------|---------------|
| X   |     |     |     | AC[d]       | DC[d]         |
| X   |     | X   |     | AC          | DC            |
| X   |     |     | X   | AC[d],Tx[m] | DC[d],Tx[m]   |
| X   |     | X   | X   | AC, Tx[m]   | DC, Tx[m]     |
|     | X   |     |     | AC[d,m]     | DC[d,m]       |
|     | X   | X   |     | AC          | DC            |
|     | X   |     | X   | AC[d,m],Tx[m] | DC[d,m],Tx[m] |
|     | X   | X   | X   | AC, Tx[m]   | DC, Tx[m]     |

AC = AC bulb on, DC = DC bulb on, Tx Wireless transmission on
[c,c] = Conditions where [d] - Dark, and [m] - Motion detected
S/L = Sensor Light Mode. PIR Passive Infrared Mode
MAN = Manual Override mode The above functions can be better understood by referring to a block diagram of one preferred embodiment as shown in FIG. 3 which includes all the above facilities. The PIR Detector block (30) detects the presence of a moving infrared energy source and outputs an active-low pulse on lead (100), which is coupled to PIR Timer block (33). The latter illuminates the PIR LED momentarily each time motion is detected and restarts the PIR timer circuit. The first output of the timer circuit is coupled via lead (107) to Processor block (36), which processes the said timer block output together with other inputs to produce two outputs on leads (109) and (110). These two outputs enable the AC bulb block (39) and DC bulb block (40) respectively. The second output of PIR timer block (33) drives the Wireless Transmitter block (38) via Transmitter Logic block (34) when the Alarm mode is active.

The proximity sensor block (31) comprises a set of three identical proximity sensors, status memory and mode indicator sections, one each for the Alarm, Sensor Light, and Manual Override modes. When set to Alarm mode, it enables the PIR Timer block (33) and Transmitter block (34) via leads (101) and (102) respectively. When set to Sensor Light mode, PIR Timer block (33) is disabled via lead (101) provided the Alarm mode is not active. At the same time, the Sensor Light Multivibrator block (35) is enabled via lead (103) and its output coupled to Processor block (36) via lead (108). When set to Manual Override mode, the Processor block (36) receives an active high signal from Sensor Touch block (31) via lead (104). Auto-reset block (32) provides an automatic reset upon power-up to the system via lead (112). Photo-Detector block (36) provides ambient light sensing information to the system via lead (111). The inputs into the Processor block (36) on leads (104), (107), (108) and (111) are processed such that the lamp functions according to table 1 above.

Figure 4:
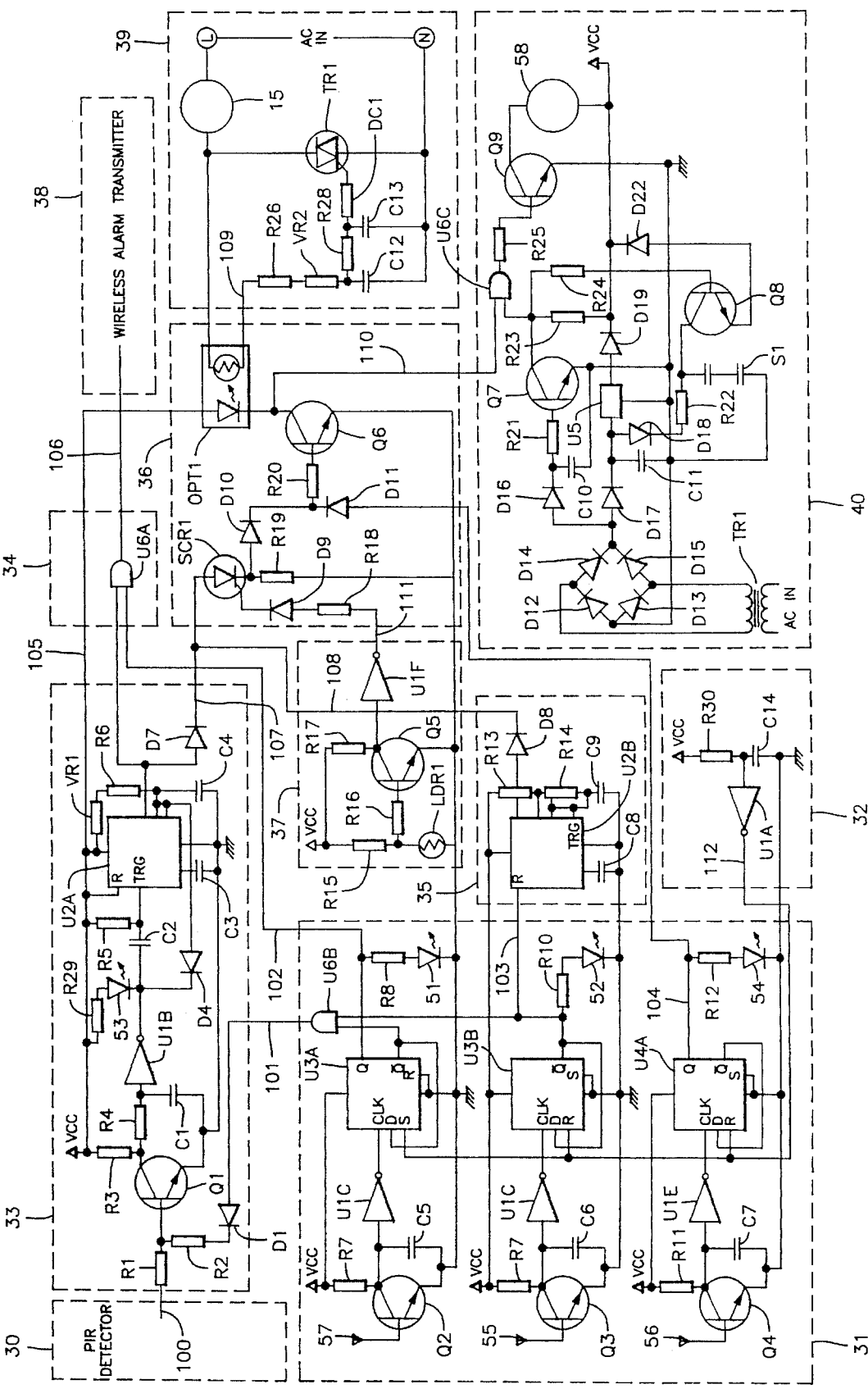
FIG. 4 is a schematic diagram of one preferred embodiment of the block diagram in FIG. 3.

FIG. 4 shows the derailed circuit of a preferred implementation of the block diagram described above. Referring to block 33, an active low signal from the PIR detector block is coupled to transistor (Q1) via resistor (R1). When motion is detected, a low pulse at the base will turn off transistor (Q1) momentarily. Capacitor (C1) charges up through resistors (R3) and (R4). This R-C network forms a pulse count circuit whose function is to eliminate false triggering due to spurious perturbation arising from electrical or environmental interference. The resulting pulse is shaped and inverted by Schmitt inverter (U1B), whose active low output drives PIR LED (53) via resistor (R29). The negative transition at the output of Schmitt inverter (U1B) is coupled via capacitor (C2) and resistor (R5) to start timer IC (U2A), which is one half of a 556 Dual Timer. Resistor (R6), variable resistor (VR1) and capacitor (C4) determine the ON duration of the timer while diode (D4) provides a discharge path for capacitor (C4), enabling the timer to restart the timing cycle every time a new movement is detected. A PIR disable signal is received on lead (101) from block 31. When this signal is high, transistor (Q1) is positively biased through diode (D1) and resistor (R2), and it will not respond to any incoming signal from the PIR detector block. This condition prevails when the Sensor Light mode is active and the Alarm mode is inactive.

The output of timer IC (U2A) is coupled to the first input of AND gate (U6A) in block 34. When the second input of said AND gate which is connected to lead (102) is also high, as when the Alarm mode is active, a high signal is coupled to Wireless Alarm Transmitter block (38) via lead (106) to activate the remote alarm receiver unit (23). The output of timer IC (U2A) is also coupled to Processor block (36) via blocking diode (D7) on lead (107). When the signal on lead (107) is high, Silicon Controlled Rectifier (SCR1) conducts through resistor (R19) if the ambient light level is low. The light level information is processed in block (37) where a light dependent resistor (LDR1) is used to bias the gate of transistor (Q5) through resistors (R15) and (R16). When it is dark, the resistance of (LDR1) drops to a level where transistor (Q5) is sufficiently biased to conduct through collector resistor (R17). The collector voltage of transistor (Q5) is shaped and inverted by Schmitt inverter (U1F) and coupled to the gate of Silicon Controlled Rectifier (SCR1) via lead (111), resistor (R18) and diode (D9). This caused the SCR to latch. The resulting high level at the cathode of (SCR1) is coupled via diode (D10) and resistor (R20) to transistor (Q6), causing it to conduct through opto-coupler (OPT1).

When the opto-coupler conducts, it provides an AC current path for the control section of the dimmer block (39), comprising limiting resistor (R26), variable resistor for dimmer control (VR2), capacitors (C12),(C13), resistor (R28) and diac (DC1). As the dimmer control resistor (VR2) is altered, the phase angle of conduction to the gate of triac (TR1) is altered accordingly, thereby providing illumination of varying intensity through the AC bulb (15) whenever a movement is detected. The bulb will continue to illuminate as long as the timer IC (U2A) output is high. The increase in ambient light level resulting from the illumination of the AC bulb (15) will not turn it off because Silicon Controlled Rectifier (SCR1) is already latched, ignoring any changes at its gate input. The latter will unlatch only when the timing cycle determined by timer IC (U2A) has elapsed.

Proximity block (31) provides the necessary circuits to change, register and display the various modes of operation of the lamp. It consists of three identical proximity sensors and memory circuits, one each for the Alarm, Sensor Light and Manual Override mode. The PIR mode does not require a separate circuit because it is mutually exclusive of the Sensor Light mode.

Referring to the Alarm mode circuit at the top of block (31), a suitable length of single strand wire is coupled to the base of a high gain NPN transistor (Q2) to act as an antenna (57). Collector resistor (R7) which is tied to the positive supply is typically 1 megohm or higher, depending on the desired sensitivity. When an object such as one's palm is brought near the antenna (57), a distortion of the electromagnetic field around the antenna causes a signal to be induced on the antenna. This signal is amplified by the transistor (Q2). Capacitor (C5) which is typically 0.1 microfarad is coupled between the collector of transistor (Q2) and ground to act as a smothering capacitor for the amplified signal. When no object is brought near the antenna the transistor (Q2) is off, the collector voltage is high and the Schmitt inverter (U1C) output is low. When an object is brought near the antenna, the collector voltage goes low and the Schmitt inverter (U1C) output goes high, producing a clock pulse for the flip-flop IC (U3A) circuit coupled to it. A CMOS 4013 dual D-flip-flop is configured such that it changes state at every incoming clock pulse. The Q output of IC (U3A) is coupled to Alarm LED (51) via resistor (RS). When set to the Alarm mode, Alarm LED (51) lights up and a high signal is sent via lead (102) to the Transmitter Logic block (34) discussed previously.

Alternatively, a small conductive surface may be connected directly to the base of transistor (Q2). Physical contact with the said surface by an electrically conductive or partially conductive object will also achieve the same result. However, when an antenna is used instead of a conductive surface, two advantages are apparent. Firstly, the object required to achieve the switching action can even be a non-electrical conductor. Secondly, no physical contact is required between the antenna and the said object. Adequate proximity and sensitivity to object size can be calibrated by altering the length of the antenna wire and/or the value of resistor (R7) and capacitor (C5).

The circuit for Sensor Light mode comprises a similar set of components (55), (Q3), (R9), (C6), (U1D) and (U3B). When set to Sensor light mode, Qbar of IC (U3B) is high and this causes the Sensor Light indicator LED (52) to light up via resistor (R10). Qbar of IC (U3B) is also "ANDed" with Qbar of IC (U3A) by AND gate (U6B) to provide the PIR disable signal on lead (101) discussed previously. In addition, the Qbar output of IC (U3B) is coupled to the Reset input of timer IC (U2B) configured as a free running multivibrator. When the Sensor Light mode is active. IC (U2B) is enabled and produces an output which is high for about 10 minutes and low for a fraction of a second. This duty cycle is determined by timing resistors (R13), (R14) and capacitor (C9). The output of IC (U2B) is coupled via blocking diode (D8) on lead (108) to processor block (36). When on Sensor Light mode, this arrangement allows the circuit to update the ambient light level information once every 10 minutes by turning the AC bulb off momentarily and taking a reading of the surrounding light intensity. If it is below a predetermined level, it will turn on the bulb (15) again. Otherwise, it will reset the Silicon Controlled Rectifier (SCR1) and turn off the bulk (15) until the ambient light intensity falls below a predetermined level again. Since the OFF time is very short, it will not be noticeable to the eye.

The circuit for Manual Override mode comprises a set of similar components (56), (Q4), (R11), (C7), (U1E) and (U4A). When set to Manual Override mode, Q output of IC (U4A) is high and it lights up Manual Override indicator (54) via resistor (R12). The said output is also coupled to Processor block (36) via diode (D 11) on lead (104). A high output will provide a permanent positive bias for transistor(Q6), thereby turning on the AC bulb (15) permanently irrespective of other prevailing conditions and operation modes.

Auto-reset block (32) provides a short positive pulse upon power-up to Set IC (U3A) and Reset ICs (U3B) and U4A). This will put the lamp in its default mode after a total power loss. Said positive pulse is produced during the brief period after power-up when capacitor (C14), which is charged via resistor (R30), has not reached the threshold voltage required to turn the output of Schmitt inverter (U1A) low.

Block (40) provides regulated DC power supply through step down transformer (T1), bridge rectifier diodes (D12–15), blocking diode (D17), smothering capacitor (C11) and voltage regulator (U5), diode (D18) charges backup battery (S1) through current limiting resistor (R22). When AC power is present, capacitor (C10), which is very much smaller in value than capacitor (C11), charges up through diode (D16) and provide a positive bias via resistor (R21) to turn on transistor (Q7). When there is an AC power failure, transistor (Q7) turns off providing a positive bias through resistor (R23) and (R24) to turn on transistor (Q8), which diverts the battery power to the VCC line through diode (D22). The collector voltage of transistor (Q7) is "ANDed" with collector voltage of transistor (Q6) by AND gate (U6C) to provide a positive base bias to transistor (Q9) through resistor (R25). Hence when there is an AC power failure, and the logic of the rest of the circuit calls for the AC bulb (15) to be illuminated, transistor (Q9) turns on to illuminate the DC bulb (58) by way of backup battery power instead.

In a modification of the invention, the electronic control is housed in an attachment (11) which has connector means whereby it may be connected directly into a suitable electrical connector socket an electrical plug or the spigot of an illumination means such as an incandescent or fluorescent lamp.

While the above is a complete description of preferred embodiments of the present invention, it is understood that the invention is not limited thereto. Thus, one variation to the preferred embodiment is to provide the Alarm indicator LED (51) with a flasher circuit such that when set to Alarm mode, said LED will flash continuously. Alternatively, a self-contained flashing LED may be used. The control can be incorporated as part of any suitable lamp and in such a case the backup batteries may be located at the base or any other part of the lamp body. In this case, there is virtually no limitation to the size of the batteries. This can turn the lamp into a truly portable lamp that could provide illumination without AC source for a considerable time between chargings. Wireless communication between the control, the remote controller and the remote sounder may be implemented by means other than RF. The remote alarm sounder unit could also be built into the base of the lamp or be an integral part of attachment (11). Therefore, it will be appreciated by those skilled in the art that yet other modifications could be made to the provided invention without deviating from its spirit and scope as so claimed.

What we claim is:

1. A control for electrically energizing an illumination means, said control having:

input means for connection to a source of electrical energy, output means for connecting electrical energy from the control to said illumination means, a first means to detect the presence of moving infrared radiation sources, a second means to compare the level of ambient light with a preset threshold, and a third means to electronically override the said first means and said second means;

said control having modes of operation which comprise:

a first operation mode wherein said output means is energized upon the detection of a moving infrared radiation source and remains energized for a predetermined period of time after cessation of said detection, provided the ambient light intensity is below a predetermined level, a second operation mode wherein said output means is energized when the ambient light intensity is below a predetermined level regardless of detection of a moving infrared radiation source, and a third operation mode wherein said output means is energized regardless of detection of a moving infrared radiation source or ambient light level, wherein each of said operation modes is controlled by a signal generated by a proximity sensor.

2. The control as claimed in claim 1, wherein the proximity sensor comprises a plurality of circuits each including an antenna for detecting an electrical signal induced onto it, an amplifier means for amplifying said electrical signal, and a pulse condition means for producing an electrical pulse from the amplifier means.

3. The control as claimed in claim 1 including:

a first indicator means which is energized at each detection of a moving infrared energy source when functioning under said first operation mode, a second indicator means which is energized continuously when functioning under said second operation mode, and a third indicator means which is energized continuously when functioning under said third operation mode.

4. The control as claimed in claim 3, wherein each indicator means is adapted to give a visual indication of the operation mode.

5. The control as claimed in claim 1, further comprising means for transmitting an alarm signal and including a fourth operation mode wherein said alarm signal is transmitted to an alarm receiver means whenever said first means detects moving infrared radiation.

6. The control as claimed in claim 5, including a fourth indicator means which is energized continuously when functioning under said fourth operation mode.

7. The control as claimed in claim 5, including a fourth indicator means which flashes continuously when functioning under said fourth operation mode.

8. The control as claimed in claim 1, further comprising:

means to prevent said output means from being de-energized as a result of feed-back of illumination from said illumination means, while functioning under said first and second operation mode; and means to de-energize said output means after the ambient light level rises above a predetermined level, while functioning under said second operation mode.

9. The control as claimed in claim 1, further comprising means for adjusting the duration for which said output means remains energized after cessation of detection of a moving infrared radiation source while functioning under said first operation mode.

10. The control as claimed in claim 1, further comprising means to automatically reset to a preferred operation mode after a total loss of electrical energy.

11. The control as claimed in claim 1, including an integral battery-operated back-up facility to automatically power the control in the event of disruption of alternating current power to the control.

12. The control as claimed in claim 1, including means to automatically connect a battery-operated reserve to the said control in the event of disruption of alternating current power to the said control and including an auxiliary illumination means adapted to be activated by said battery-operated reserve in accordance with the specific operation mode under which the control has been set to operate.

13. The control as claimed in claim 1, wherein the electronic, electrical and mechanical components of the control are housed in a self-contained portable unit.

* * * * *